United States Patent
Hou et al.

(10) Patent No.: US 10,439,710 B2
(45) Date of Patent: Oct. 8, 2019

(54) PASSIVE WAVELENGTH DIVISION MOBILE FRONTHAUL NETWORK SYSTEM

(71) Applicant: T&S Communications Co., Ltd., Shenzhen, Guangdong (CN)

(72) Inventors: Dan Hou, Guangdong (CN); Shu Huang, Guangdong (CN); Jindong Wu, Guangdong (CN)

(73) Assignee: T&S Communications Co., Ltd., Shenzhen (CN)

(*) Notice: Subject to any disclaimer, the term of this patent is extended or adjusted under 35 U.S.C. 154(b) by 0 days.

(21) Appl. No.: 16/128,480

(22) Filed: Sep. 11, 2018

(65) Prior Publication Data
US 2019/0028190 A1    Jan. 24, 2019

Related U.S. Application Data

(63) Continuation of application No. PCT/CN2017/072689, filed on Jan. 25, 2017.

(51) Int. Cl.
*H04B 10/08* (2006.01)
*H04B 17/00* (2015.01)
(Continued)

(52) U.S. Cl.
CPC ..... *H04B 10/071* (2013.01); *H04B 10/25753* (2013.01); *H04B 10/27* (2013.01); *H04J 14/02* (2013.01); *H04J 14/0282* (2013.01)

(58) Field of Classification Search
CPC .. H04B 10/071; H04B 10/25753; H04J 14/02
See application file for complete search history.

(56) References Cited

U.S. PATENT DOCUMENTS 5,329,392 A * 7/1994 Cohen ................ G01M 11/3154
398/13
8,655,167 B1 * 2/2014 Lam ..................... H04B 10/071
398/16
(Continued)

FOREIGN PATENT DOCUMENTS

CN     102790644 A     11/2012
CN     103227677 A      7/2013
(Continued)

OTHER PUBLICATIONS

International Search Report of PCT Patent Application No. PCT/CN2017/072689 dated Jul. 10, 2017.

*Primary Examiner* — David C Payne
*Assistant Examiner* — Pranesh K Barua (57) ABSTRACT

A passive wavelength division mobile fronthaul network system includes a central office end, a remote end, a trunk optical fiber; a first transport unit, configured to transport, on one end of the trunk optical fiber, detection light to the trunk optical fiber; a second transport unit, configured to transport, on the other end of the trunk optical fiber, the detection light from the trunk optical fiber to each branch of the remote end; and a reflector, deployed on an end of each branch of the remote end for reflecting the detection light. The first transport unit combines the detection light to the trunk optical fiber, the second transport unit transmits, on the remote end, the detection light from the trunk optical fiber to each branch of the remote end, and finally, the reflector returns the detection light along the original path.

6 Claims, 10 Drawing Sheets

(51) Int. Cl.
 *H04B 10/071* (2013.01)
 *H04J 14/02* (2006.01)
 *H04B 10/27* (2013.01)
 *H04B 10/2575* (2013.01)

(56) References Cited

U.S. PATENT DOCUMENTS

| | | | | |
|---|---|---|---|---|
| 8,693,866 B1* | 4/2014 | Lam | .................... | H04B 10/071 398/13 |
| 9,240,855 B1* | 1/2016 | Lam | .................... | H04B 10/071 |
| 2006/0051088 A1* | 3/2006 | Lee | .................... | H04B 10/00 398/31 |
| 2006/0092404 A1* | 5/2006 | Weller | .................... | H04B 10/071 356/73.1 |
| 2008/0291431 A1* | 11/2008 | Wang | .................... | G01M 11/3136 356/73.1 |
| 2011/0001959 A1* | 1/2011 | Hasegawa | .................... | G01M 11/3172 356/73.1 |
| 2011/0255860 A1* | 10/2011 | Lee | .................... | G01M 11/3136 398/12 |
| 2012/0134663 A1* | 5/2012 | Wang | .................... | H04B 10/032 398/5 |
| 2013/0021598 A1* | 1/2013 | Komamaki | .................... | G01M 11/3136 356/73.1 |
| 2013/0208264 A1* | 8/2013 | Ahadian | .................... | G01M 11/3145 356/73.1 |
| 2013/0223841 A1* | 8/2013 | Lee | .................... | H04J 14/0232 398/72 |
| 2013/0259469 A1* | 10/2013 | Smith | .................... | H04J 14/0227 398/16 |
| 2014/0037285 A1* | 2/2014 | Perron | .................... | G01M 11/3127 398/21 |
| 2015/0023658 A1* | 1/2015 | Vilela De Faria | ... | H04B 10/071 398/21 |
| 2015/0229389 A1* | 8/2015 | Kim | .................... | H04B 10/073 398/17 |
| 2016/0097901 A1* | 4/2016 | Lu | .................... | H04J 14/0282 385/18 |
| 2016/0187224 A1* | 6/2016 | Chen | .................... | H04B 10/07955 356/73.1 |

FOREIGN PATENT DOCUMENTS

| | | |
|---|---|---|
| CN | 103763020 A | 4/2014 |
| CN | 104009794 A | 8/2014 |
| CN | 104009796 A | 8/2014 |
| CN | 204103924 U | 1/2015 |
| CN | 105337660 A | 2/2016 |
| CN | 106817159 A | 6/2017 |
| KR | 20040023305 A | 3/2004 |

* cited by examiner

FIG. 10

PASSIVE WAVELENGTH DIVISION MOBILE FRONTHAUL NETWORK SYSTEM

CROSS REFERENCE TO RELATED APPLICATIONS

This application is a continuation application of PCT/CN2017/072689 filed on Jan. 25, 2017. The contents of the above-mentioned applications are all hereby incorporated by reference.

BACKGROUND

Field of the Invention

The present invention relates to the field of passive wavelength division mobile fronthaul networks, and in particular, to a passive wavelength division mobile fronthaul network system.

Related Arts

With the quick popularity of intelligent terminals and the rapid development of the mobile Internet, mobile services exponentially increase, and mobile networks operators are facing higher pressure for data transmission. Cloud/centralized radio access network (C-RAN) has become an important trend of future wireless fronthaul network.

In passive wavelength division fronthaul scheme, a coarse wavelength division multiplexer or a dense wavelength division multiplexer (CWDM/DWDM) is used to combine and transmit multiple paths of signals within single fiber, so as to expand the mobile network with limited optical fiber resources. Only passive components and devices are used in this scheme, providing following advantages: no power supply needed, no additional active device so no extra transmission delay introduced, and transparent to various services and data rates.

During the installation and operation of a C-RAN fronthaul network, it could be significantly important to comprehensively diagnose the network. The major possible faults may include: radio remote unit (RRU) power failure, transmission optical fiber breakage, RRU device failure, jitter or delay in transmission, RRU RF signal interference, and the like.

An optical time domain reflectometer (OTDR) is a device used to detect the faults on optical fiber links in a network. By introducing OTDR monitoring, whether the fault comes from the optical fiber link or from transmission signals or devices can be distinguished. However, in passive wavelength division fronthaul scheme, because each branch after a wavelength division device can transmit only a specific wavelength, it is difficult for a regular U-band OTDR (ultralong wavelength band, an optical band with a wavelength from 1625 nm to 1675 nm) to detect the link status of the branches after the wavelength division device.

SUMMARY

The present invention is directed to provide a passive wavelength division mobile fronthaul network system, to facilitate diagnosis of a network fault in a passive wavelength division mobile fronthaul network.

To resolve the foregoing technical problem, the present invention uses the following technical solutions:

A passive wavelength division mobile fronthaul network system includes a central office end, a remote end, and a trunk optical fiber, and further includes a detector, a first wavelength division multiplexing apparatus, a second wavelength division multiplexing apparatus, an optical transport unit, and a reflector, where an optical path can be formed between the detector and the first wavelength division multiplexing apparatus, one end of the trunk optical fiber is connected to the first wavelength division multiplexing apparatus, the other end of the trunk optical fiber is connected to the second wavelength division multiplexing apparatus; the optical transport unit can transmit detection light from an output end of the second wavelength division multiplexing apparatus to each branch of the remote end, and the reflector is deployed on an end of each branch of the remote end.

In some preferred embodiments, a two-stage switcher and a detection device are further included, where the two-stage switcher includes a light extractor, a first-stage light switcher, a wavelength division multiplexer, and a second-stage light switcher, the light extractor is mounted on the trunk optical fiber, the first-stage light switcher receives light output by the light extractor, the wavelength division multiplexer transmits light between the first-stage light switcher and the second-stage light switcher, and the detection device receives light output by the second-stage light switcher.

In further preferred embodiments, a second splitter or a third-stage light switcher is further included, where the wavelength division multiplexer receives, by using the second splitter or the third-stage light switcher, light output by the first-stage light switcher, and the second-stage light switcher receives light output by the second splitter or the third-stage light switcher.

In further preferred embodiments, the wavelength division multiplexer is replaced with a coarse wavelength division multiplexer and a dense wavelength division multiplexer that receives light output by the coarse wavelength division multiplexer, the first-stage light switcher outputs light to the coarse wavelength division multiplexer, and the second-stage light switcher receives light emitted from the dense wavelength division multiplexer.

In further preferred embodiments, there are two or more two-stage switchers, one of the two-stage switchers collects uplink signals on the trunk optical fiber, and one of the two-stage switchers collects downlink signals on the trunk optical fiber; or one of the two-stage switchers collects a half of signals of the trunk optical fiber, and one of the two-stage switcher collects the other half of signals of the trunk optical fiber.

In further preferred embodiments, at least one terminal is included, where the terminal is connected to the two-stage switcher and/or the detection device, and the terminal can send alarm signals.

In some preferred embodiments, the first wavelength division multiplexing apparatus consists of a central office end wavelength division multiplexer provided with a channel for detection light, or consists of a central office end wavelength division multiplexer provided with no detection light channel and a first add/drop multiplexer; the second wavelength division multiplexing apparatus consists of a remote end wavelength division multiplexer provided with a channel for detection light, or consists of a remote end wavelength division multiplexer provided with no detection light channel and a second add/drop multiplexer; the optical transport unit includes a first splitter and a third add/drop multiplexer; the first splitter can extract light between the second wavelength division multiplexing apparatus and the third add/drop multiplexer; and the third add/drop multiplexer is deployed on a branch of the remote end.

In further preferred embodiments, a third splitter is further included, where detection light emitted by the detector is transmitted to the detection light channel and/or the first add/drop multiplexer of the central office end wavelength division multiplexer after being transmitted to the third splitter, there is at least one detector, and there is at least one third splitter.

In another aspect, the present invention further provides the following technical solutions:

A passive wavelength division mobile fronthaul network system includes a central office end, a remote end, and a trunk optical fiber, and further includes: a first transport unit, deployed on one end of the trunk optical fiber to transport detection light to the trunk optical fiber; a second transport unit, deployed on the other end of the trunk optical fiber to transport the detection light from the trunk optical fiber to each branch of the remote end; and a plurality of reflectors, deployed on the ends of each branch of the remote end to reflect the detection light; and the detection light is delivered to the ends of each branch through the trunk and then is reflected and returned along the original path. By analyzing the reflected light, whether a fault has occurred in the network can be detected.

In some preferred embodiments, a third transport unit and a detection device are further included, where the third transport unit is configured to transport signal light from different trunk optical fibers and/or signal light of different wavelengths to the detection device, the detection device is configured to detect whether the signal light is abnormal. By extracting and analyzing all signal light from the trunk optical fiber, whether a fault has occurred in the network can be detected.

Compared with the prior art, the present invention has the following beneficial effects:

According to the present invention, the first transport unit adds the detection light to the trunk optical fiber; the second transport unit, which is deployed on the remote end, transports the detection light from the trunk optical fiber to each branch of the remote end, and finally, the reflector returns the detection light along the original path. In this way, the detection light can be applied to detect the trunk optical fiber and each branch of the remote end whether a fault has occurred. The present invention has few changes to the network, and few additional components, and offers the advantages of easy deployment and low costs.

In a preferred embodiment, the present invention further has the following beneficial effects:

Further, the third transport unit may transport signal light of different trunk optical fibers and/or signal light of different wavelengths to the detection device, so as to detect all signal light in the network. The third transport unit is used in combination with the first transport unit, the second transport unit, and the reflectors, so that the fault in the network can be detected in a comprehensive manner.

DETAILED DESCRIPTION

The following describes embodiments of the present invention in detail. It should be emphasized that the following description is merely exemplary, and is not intended to limit the scope and application of the present invention. "First" in the embodiments does not indicate that there is only one component. For example, there may be a plurality of "first wavelength division multiplexing apparatuses".

First Embodiment

Figure 1:
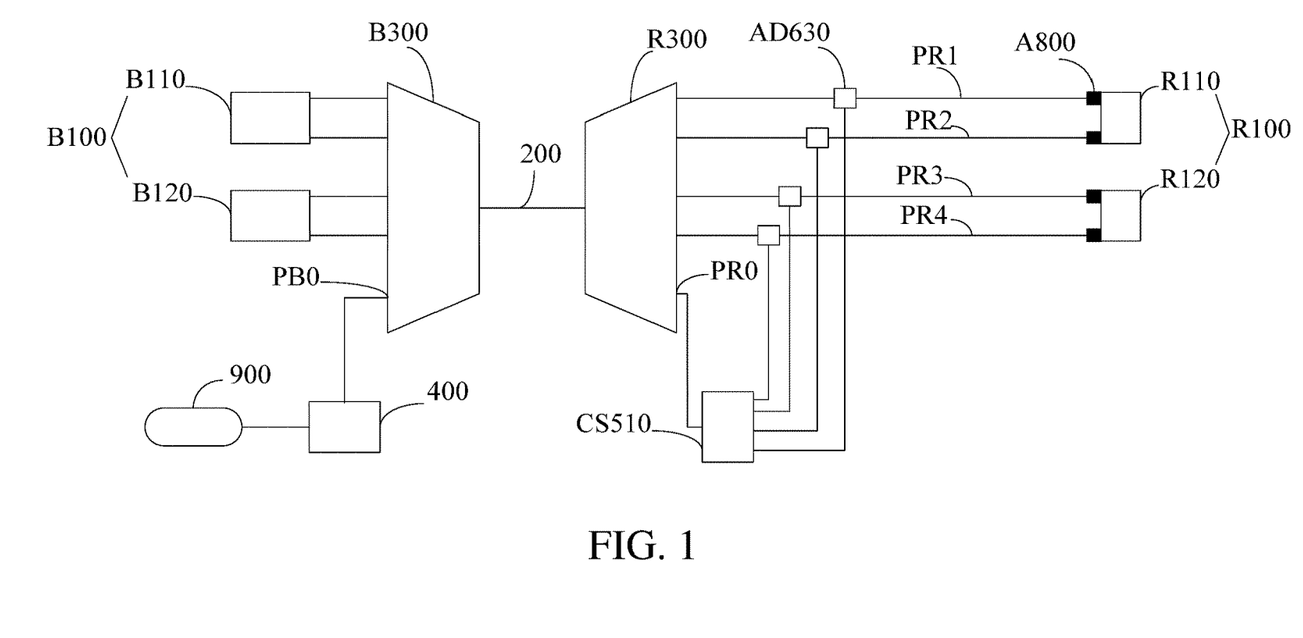
FIG. 1 is a schematic structural diagram of a first embodiment of the present invention.

Referring to FIG. 1, a passive wavelength division mobile fronthaul network system in this embodiment includes a central office end B100, a remote end R100, a trunk optical fiber 200, a central office end wavelength division multiplexer B300, and a remote end wavelength division multiplexer R300. The central office end B100 is a communication device BBU, and the remote end R100 is a communication device RRU. In this embodiment, there are two communication device BBUs and two communication device RRUs, which are respectively B110, B120, R110, and R120. The communication device BBU and RRU have respective network managers (not shown in the figure). When some faults occur in the network, the network managers can provide an alarm within a limited range.

The communication device BBU and RRU are configured to receive and send communication signals to each other. Specifically, optical modules are configured on the BBU and the RRU, so that the communication device B110 sends 1310-nm signal light to the communication device R110, the communication device R110 sends 1330-nm signal light to the communication device B110, the communication device B120 sends 1350-nm signal light to the communication device R120, and the communication device R120 sends 1370-nm signal light to the communication device B120.

The central office end wavelength division multiplexer B300 is configured to combine light of different wavelengths into one path or allocate light to different branches based on respective wavelengths. The central office end wavelength division multiplexer B300 is provided with a detection light channel PB0, for transmitting detection light. The detection light channel may be implemented by adding a channel of a corresponding wavelength to the central office end wavelength division multiplexer B300 in a process of manufacturing the central office end wavelength division multiplexer B300. The detection light can be transmitted in the channel of the corresponding wavelength.

The remote end wavelength division multiplexer R300 is configured to allocate, on the remote end, light to corresponding branches based on respective wavelengths or combine light of different wavelengths into one path. The remote end wavelength division multiplexer R300 is also provided with a detection light channel PR0, for transmitting detection light. The detection light channel may be implemented by adding a channel of a corresponding wavelength to the central office end wavelength division multiplexer R300 in a process of manufacturing the central office end wavelength division multiplexer R300. The detection light can be transmitted in the channel of the corresponding wavelength.

Optical fiber lengths of the branches of the remote end are different from each other. In this embodiment, there are four branches of the remote end R100, which are respectively PR1, PR2, PR3, and PR4. Optical fiber lengths of the branches are different from each other, and are incremented by 5 meters from PR1 to PR4.

The trunk optical fiber 200 is configured to transmit signal light of the central office end B100 to the remote end R100.

The communication devices B110 and B120 separately transmit light to an input end of the trunk optical fiber 200 by using the central office end wavelength division multiplexer B300. Signal light transmitted by the trunk optical fiber 200 is demultiplexed by the remote end wavelength division multiplexer B300 and then is fed into the communication devices B110 and B120.

A detector, a first splitter CS510, a third add/drop multiplexer AD630, a reflector, a terminal 900, and a network management device are further included.

The detector is configured to emit detection light and feed the detection light into the detection light channel PB0 of the central office end wavelength division multiplexer B300. Specifically, in this embodiment, the detector is an optical time domain reflectometer 400, which emits detection light of a wavelength 1650 nm.

The first splitter CS510 is configured to receive detection light from the detection light channel PR0 of the remote end wavelength division multiplexer R300, and split the detection light into a plurality of paths. In this embodiment, the first splitter CS510 is a power splitter.

The third add/drop multiplexer AD630 is configured to multiplex or demultiplex light, is deployed on a branch of the remote end R100, and receives light transmitted from the first splitter CS510.

The reflector is configured to reflect detection light. In this embodiment, the reflector is a route tracker A800, and is deployed on an end of a branch of the remote end R100.

The terminal 900 is configured to control the optical time domain reflectometer 400 or process a signal transmitted by the optical time domain reflectometer 400.

In this embodiment, the central office end wavelength division multiplexer B300 is a first wavelength division multiplexing apparatus, the remote end wavelength division multiplexer R300 is a second wavelength division multiplexing apparatus, and the first splitter CS510 and the third add/drop multiplexer AD630 constitute an optical transport unit.

The terminal 900 controls the optical time domain reflectometer 400 to emit detection light of a wavelength 1650 nm, and feed the detection light into the detection light channel PB0 of the central office end wavelength division multiplexer B300. The central office end wavelength division multiplexer B300 multiplexes signal light that is of different wavelengths and that is emitted by the communication devices B110 and B120 with the detection light, and then the multiplexed light is transmitted to the remote end wavelength division multiplexer R300 by the trunk optical fiber 200 for demultiplexing. Signal light of different wavelengths is output from each signal light channel of the remote end wavelength division multiplexer R300 and is respectively transported to each branch of the remote end R100. The detection light channel PR0 of the remote end wavelength division multiplexer R300 outputs detection light to the first splitter CS510. The detection light passes through the first splitter CS510, and then is divided into four paths. The four paths of detection light are separately transmitted to the third add/drop multiplexer AD630 deployed on each branch of the remote end R100, is multiplexed with signal light on each branch, and is finally transmitted to an end of the branch. The signal light is received by the communication devices R110 and R120 for wireless communication. However, the detection light is reflected by the route tracker A800 and then is returned along the original path, and is finally received by the optical time domain reflectometer 400. Because optical fiber lengths of the branches PR1, PR2, PR3, and PR4 are set to be different from each other, a reflection peak representing each branch of the remote end R100 is obtained on the optical time domain reflectometer 400.

Faults of the trunk optical fiber 200 and the branches are detected by analyzing the reflection peak obtained by the optical time domain reflectometer 400, and types of the faults are specifically identified in combination with the alarm provided by the network managers of the communication device BBU and/or the communication device RRU. If a communication device RRU sends an alarm and notifies that a branch on which the RRU is located has a fault, and the optical time domain reflectometer 400 can receive a reflection peak corresponding to the branch and an optical power is normal, it indicates that the branch optical fiber link is complete, and therefore the fault comes from the device. If the optical time domain reflectometer 400 can receive the reflection peak of the branch, but the optical power obviously decreases, it indicates that relatively large loss, for example, optical fiber bending or connector fouling may exist on the branch optical fiber link. If the optical time domain reflectometer 400 cannot receive the reflection peak corresponding to the branch, it indicates that the branch optical fiber link has a fault. If the trunk optical fiber 200 has a fault, the network manager of the corresponding communication device BBU sends an alarm.

According to the foregoing descriptions, it can be learned that according to this embodiment of the present invention, the optical time domain reflectometer 400 is enabled to emit detection light, and feed the detection light into the central office end wavelength division multiplexer B300 for multiplexing with signal light, and then the multiplexed light is transmitted in the trunk optical fiber 200; the light is demultiplexed on the remote end R100 by the remote end wavelength division multiplexer R300, and then the detection light is multiplexed with the signal light again, and the light is fed into each branch. In this way, the detection light emitted by the optical time domain reflectometer 400 can reach each branch, and a reflection peak of each branch is obtained on the optical time domain reflectometer 400. Whether the fault of the network comes from the device or the optical fiber link can be distinguished in combination with the alarm of the network managers of the communication device BBU and/or the communication device RRU, provided that a detection light channel PB0 and a detection light channel PR0 are respectively added to the central office end wavelength division multiplexer B300 and the remote end wavelength division multiplexer R300 and several passive devices are added to the network. The change to the network is small, and there are few added devices, which are not complex. The advantages are easy operation and low costs.

Referring to FIG. 1, in this embodiment, the first transport unit includes the optical time domain reflectometer 400 and the central office end wavelength division multiplexer B300. The second transport unit includes the remote end wavelength division multiplexer R300, the first splitter CS510, and the third add/drop multiplexer AD630. The first transport unit emits the detection light, multiplexes the detection light with the signal light emitted by the communication device BBU, and then outputs the multiplexed light to the input end of the trunk optical fiber 200. The second transport unit feeds, on the remote end, the detection light to each branch of the remote end from the trunk optical fiber 200, and finally returns the detection light along the original path by using the route tracker A800. Namely, whether the network has a fault is detected by multiplexing the detection light with the signal light into the trunk, transmitting the multiplexed light to an end of each branch, and returning the light along the original path, and then whether the entire network has a fault is detected in a compressive manner in combination with the alarm of the network managers of the communication device BBU and/or the communication device RRU and the fault is positioned.

The foregoing describes the first embodiment, but this embodiment may further have some variants, for example:

The type of the third add/drop multiplexer AD630 may be a thin film filter type, or a fused biconical taper type.

The type of the reflector may be a fiber grating type or a thin film filter type.

Second Embodiment

Figure 2:
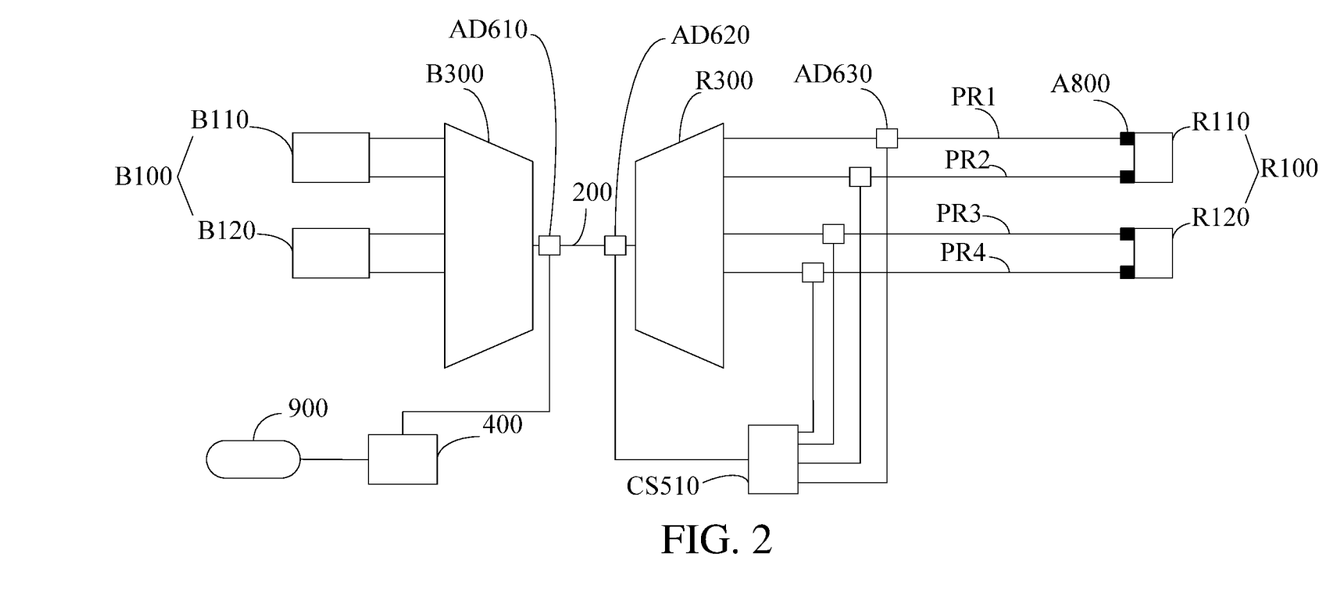
FIG. 2 is a schematic structural diagram of a second embodiment of the present invention.

Referring to FIG. 2, this embodiment differs from the first embodiment in that, a first add/drop multiplexer AD610 is mounted at a location, close to a central office end wavelength division multiplexer B300, of a trunk optical fiber 200, and a second add/drop multiplexer AD620 is mounted at a location, close to a remote end wavelength division multiplexer R300, of the trunk optical fiber 200.

Detection light emitted by an optical time domain reflectometer 400 enters the first add/drop multiplexer AD610, is multiplexed with signal light output by the central office end wavelength division multiplexer B300, and then is transmitted on the trunk optical fiber 200. The second add/drop multiplexer AD620 demultiplexes the detection light from the trunk optical fiber 200 and transmits the detection light to a first splitter CS510. Then, the detection light is transmitted to each branch. In this embodiment, the first splitter CS510 is a power splitter.

In this embodiment, the central office end wavelength division multiplexer B300 and the first add/drop multiplexer AD610 constitute a first wavelength division multiplexing apparatus; the remote end wavelength division multiplexer R300 and the second add/drop multiplexer AD620 constitute a second wavelength division multiplexing apparatus; and the first splitter CS510 and the third add/drop multiplexer AD630 constitute an optical transport unit.

According to the foregoing description, it can be learned that this embodiment also has the effect of the first embodiment. In addition, this embodiment is also applicable to a case in which the central office end wavelength division multiplexer B300 and the remote end wavelength division multiplexer R300 are not provided with a detection light channel, provided that a first add/drop multiplexer AD610 and a second add/drop multiplexer AD620 are respectively mounted on two ends of the trunk optical fiber 200.

Referring to FIG. 2, in this embodiment, the first transport unit includes the optical time domain reflectometer 400 and the first add/drop multiplexer AD610, and the second transport unit includes the second add/drop multiplexer AD620, the first splitter CS510, and the third add/drop multiplexer AD630.

Third Embodiment

Figure 3:
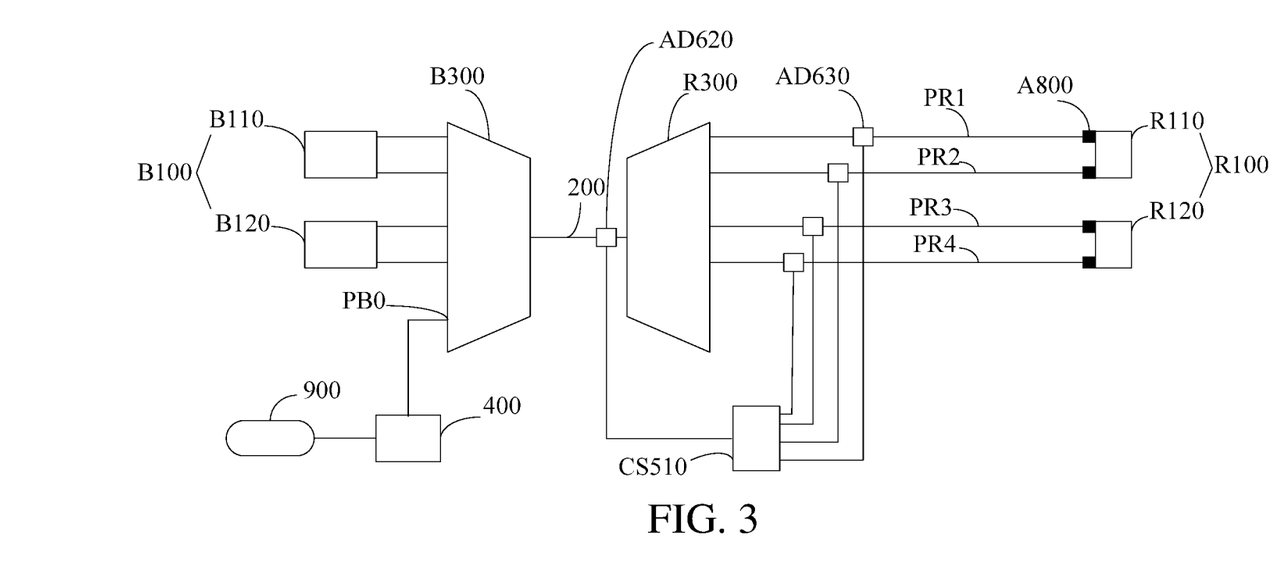
FIG. 3 is a schematic structural diagram of a third embodiment of the present invention.

Referring to FIG. 3, this embodiment differs from the first embodiment in that, a second add/drop multiplexer AD620 is mounted at a location, close to a remote end wavelength division multiplexer R300, of a trunk optical fiber 200. The second add/drop multiplexer AD620 demultiplexes detection light from the trunk optical fiber 200 and transmits the detection light to a first splitter CS510. Then, the detection light is transmitted to each branch. In this embodiment, the first splitter CS510 is a power splitter.

In this embodiment, a central office end wavelength division multiplexer B300 is a first wavelength division multiplexing apparatus, the remote end wavelength division multiplexer R300 and the second third add/drop multiplexer AD620 constitute a second wavelength division multiplexing apparatus, and the first splitter CS510 and a third add/drop multiplexer AD630 constitute an optical transport unit.

According to the foregoing content, it can be learned that this embodiment also has the effect of the first embodiment. In addition, this embodiment is also applicable to a case in which the remote end wavelength division multiplexer R300 is not provided with a detection light channel, provided that a second add/drop multiplexer AD620 is mounted at a location, close to the remote end wavelength division multiplexer R300, of the trunk optical fiber 200.

Referring to FIG. 3, in this embodiment, a first transport unit includes an optical time domain reflectometer 400 and the central office end wavelength division multiplexer B300, and a second transport unit includes the second add/drop multiplexer AD620, the first splitter CS510, and the third add/drop multiplexer AD630.

Fourth Embodiment

Figure 4:
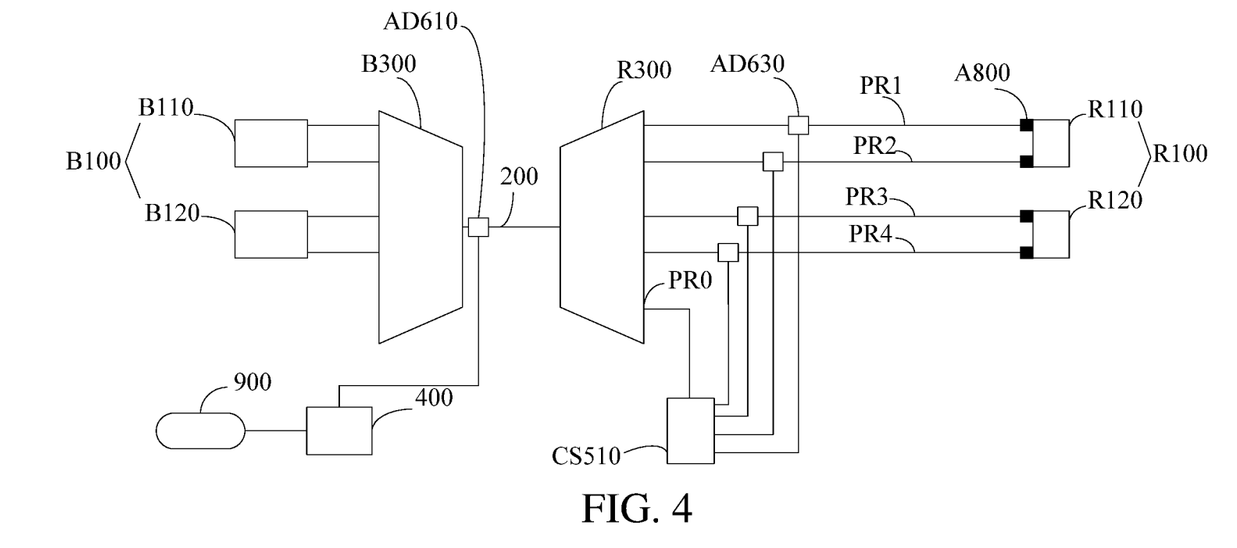
FIG. 4 is a schematic structural diagram of a fourth embodiment of the present invention.

Referring to FIG. 4, this embodiment differs from the first embodiment in that, a first add/drop multiplexer AD610 is mounted at a location, close to a central office end wavelength division multiplexer B300, of a trunk optical fiber 200. Detection light emitted by an optical time domain reflectometer 400 enters the first add/drop multiplexer AD610, is multiplexed with signal light output by the central office end wavelength division multiplexer B300, and then is transmitted on the trunk optical fiber 200.

In this embodiment, a central office end wavelength division multiplexer B300 and the first add/drop multiplexer AD610 constitute a first wavelength division multiplexing apparatus, the remote end wavelength division multiplexer R300 is a second wavelength division multiplexing apparatus, and the first splitter CS510 and a third add/drop multiplexer AD630 constitute an optical transport unit.

In this embodiment, the first splitter CS510 is a power splitter.

According to the foregoing content, it can be learned that this embodiment also has the effect of the first embodiment. In addition, this embodiment is also applicable to a case in which the central office end wavelength division multiplexer B300 is not provided with a detection light channel, provided that a first add/drop multiplexer AD610 is mounted at a location, close to the central office end wavelength division multiplexer B300, of the trunk optical fiber 200.

Referring to FIG. 4, in this embodiment, the first transport unit includes the optical time domain reflectometer 400 and the first add/drop multiplexer AD610, and the second transport unit includes the remote end wavelength division multiplexer R300, the first splitter CS510, and the third add/drop multiplexer AD630.

Fifth Embodiment

Referring to FIG. 1 to FIG. 5, this embodiment differs from the first, second, third, and fourth embodiments in that, a network system of this embodiment includes two trunk optical fibers 200A and 200B and a third splitter CS530; the third splitter CS530 is an optical switch; a central office end wavelength division multiplexer B300A is provided with a detection light channel PB0, and the trunk optical fiber 200B is provided with a first add/drop multiplexer AD610. Detection light emitted by an optical time domain reflectometer 400 is switched to the detection light channel PB0 of the central office end wavelength division multiplexer B300A or the first add/drop multiplexer AD610 by using the third splitter CS530.

Figure 5:
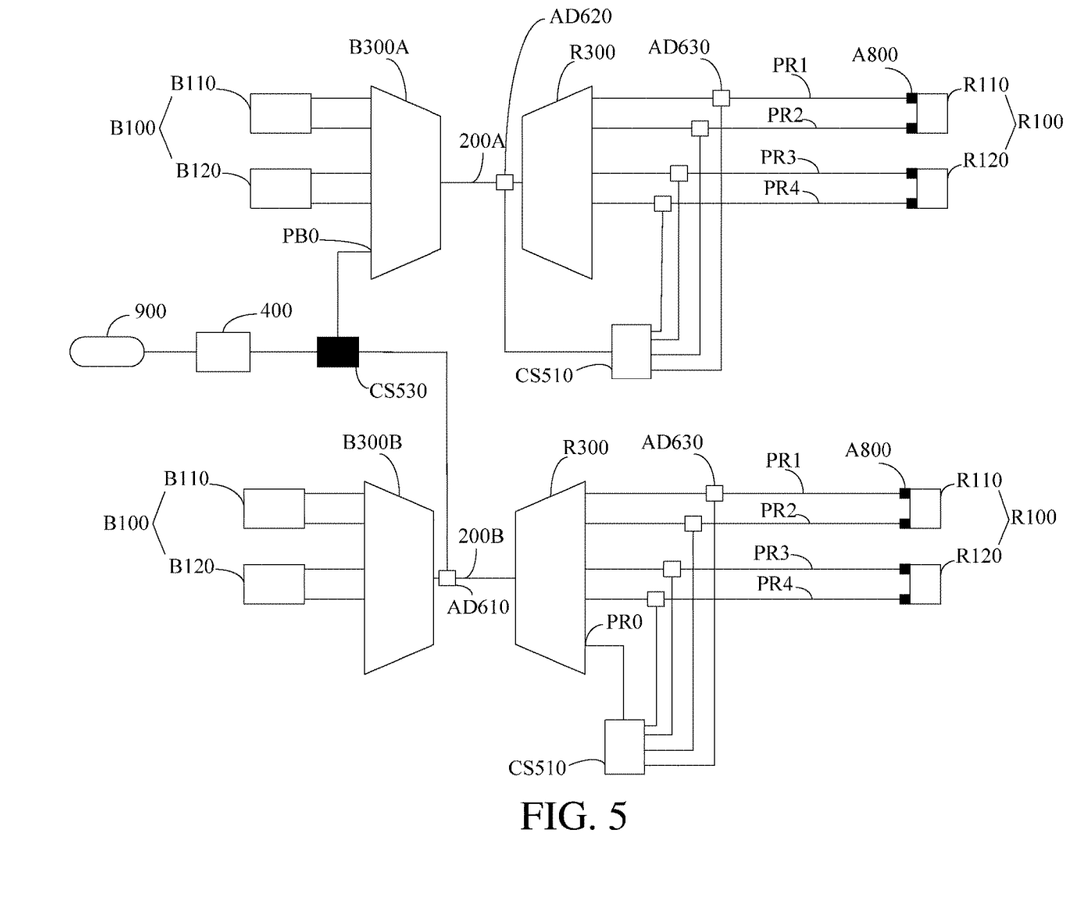
FIG. 5 is a schematic structural diagram of a fifth embodiment of the present invention.

According to the foregoing description, it can be learned that the detection light emitted by the optical time domain reflectometer 400 is fed to the central office end wavelength division multiplexer B300A or the first add/drop multiplexer AD610 by using a third splitter CS530, so that a network system having two trunk optical fibers can be detected by using one optical time domain reflectometer 400, to save resources, thereby reducing costs.

This embodiment also has the effects of the first, second, third, and fourth embodiments.

In this embodiment, a first transport unit includes the optical time domain reflectometer 400, the third splitter CS530, the central office end wavelength division multiplexer B300A, and the first add/drop multiplexer AD610; and a second transport unit includes a remote end wavelength division multiplexer R300, a first splitter CS510, a second add/drop multiplexer AD620 and a third add/drop multiplexer AD630.

In this embodiment, the first splitter CS510 is a power splitter.

The foregoing describes the first embodiment, but this embodiment may further have some variants, for example:

There are two or more trunk optical fibers in the network system.

The number of detectors is greater than two, and/or the number of third splitters is greater than two.

The third splitter CS530 may further be a power splitter. Detection light emitted by the optical time domain reflectometer 400 is transmitted to the detection light channel PB0 of the central office end wavelength division multiplexer B300A and the first add/drop multiplexer AD610 by using the third splitter CS530, so that a network system having two or more trunk optical fibers can be detected by using one optical time domain reflectometer 400.

The remote end wavelength division multiplexer may not be provided with a detection light channel. Accordingly, an add/drop multiplexer is mounted at a location, close to the remote end wavelength division multiplexer, of the trunk optical fiber.

Sixth Embodiment

Figure 6:
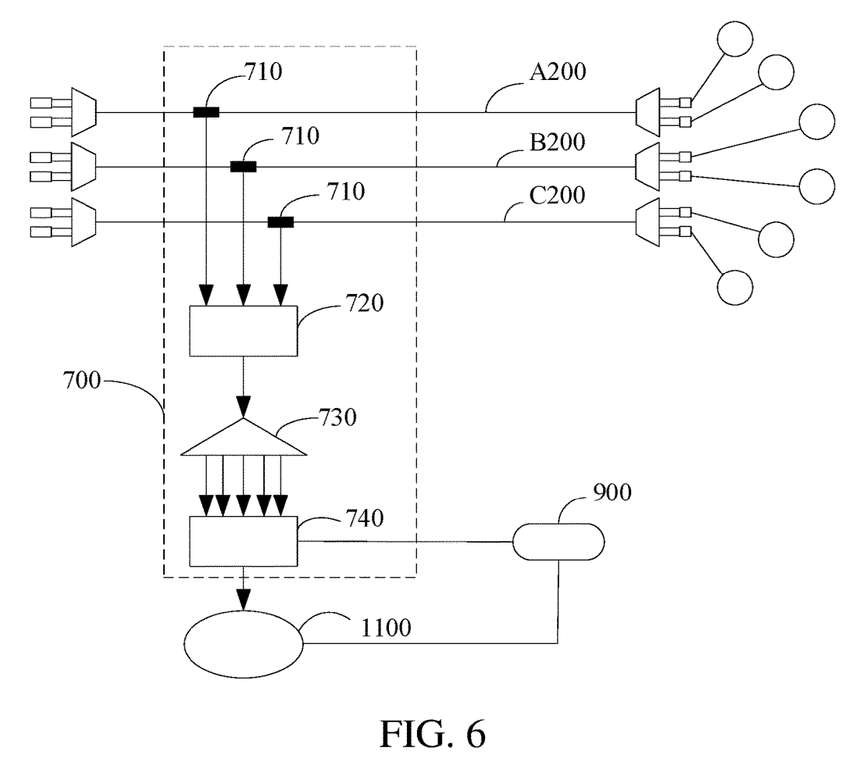
FIG. 6 is a schematic structural diagram of a sixth embodiment of the present invention.

Referring to FIG. 6, a passive wavelength division mobile fronthaul network system in this embodiment includes three trunk optical fibers, which are respectively A200, B200, and C200, and further includes a light extractor, a first-stage light switcher 720, a wavelength division multiplexer 730, a second-stage light switcher 740, a detection device 1100, and a terminal 900. The light extractor is configured to extract light from the trunk optical fiber. In this embodiment, a power splitter 710 is a light extractor.

The power splitter 710 is configured to extract a part of an optical power from the trunk optical fiber.

The first-stage light switcher 720 is an optical switch, configured to control light outputs.

The wavelength division multiplexer 730 is configured to demultiplex light. A wavelength of the wavelength division multiplexer 730 corresponds to a wavelength of light selected in a network system, and covers each wavelength used on each trunk optical fiber. For a network system whose uplink and downlink are each provided with N wavelengths, the wavelength division multiplexer 730 should have all the 2N wavelengths. In this embodiment, the uplink and downlink in the network system are each provided with six wavelengths, and therefore the wavelength division multiplexer 730 has 12 wavelengths.

The second-stage light switcher 740 is also an optical switch, configured to control light outputs.

In this embodiment, the two-stage switcher 700 includes the power splitter 710, the first-stage light switcher 720, the wavelength division multiplexer 730, and the second-stage light switcher 740.

The terminal 900 is configured to control the two-stage switcher 700.

One power splitter 710 is mounted on each trunk optical fiber. The first-stage light switcher 720 receives light extracted by three power splitters 710 from the trunk optical fibers, and selectively outputs light on one trunk optical fiber to the wavelength division multiplexer 730. The light is demultiplexed by the wavelength division multiplexer 730 into light of different wavelengths, and then is fed into the second-stage light switcher 740. The second-stage light switcher 740 selectively outputs light of a particular wavelength to the detection device 1100.

According to the foregoing content, it can be learned that during operation of a network system, the terminal 900 controls the first-stage light switcher 720 to select a particular trunk optical fiber, and controls the second-stage light switcher 740 to select a particular wavelength, and the detection device 1100 receives light of a particular wavelength of a particular trunk optical fiber. In this way, all signal light in the network can be detected on the central office end B100. By analyzing the signal light, various faults in the network such as delay and jitter faults of signal transmission can be detected. In particular, when the detection device 1100 uses a wireless protocol analyzer, a wireless signal can be detected on the central office end B100, to avoid unnecessary on-tower work, thereby quickly detecting problems such as noise interference.

In addition, a mutually supplementary function is implemented in combination with use of a detection apparatus consisting of a first transport unit, a second transport unit, and a reflector. When the network has a fault, device faults are excluded by using network managers of the communication device BBU and/or the communication device RRU of the device, signal light and wireless signal faults are excluded by using the detection device 100, and optical fiber link faults are excluded by using a detector (optical time domain reflectometer 400), so that faults can be positioned accurately in a comprehensive manner, thereby performing quick repair, and ensuring communication quality.

Referring to FIG. 6, in this embodiment, a third transport unit includes a power splitter 710, a first-stage light switcher 720, a wavelength division multiplexer 730, and a second-stage light switcher 740.

The foregoing describes the first embodiment, but this embodiment may further have some variants, for example:

The light extractor may also be an add/drop multiplexer.

The technical solution of this embodiment may also be combined with the technical solution of the fifth embodiment.

Seventh Embodiment

Figure 7:
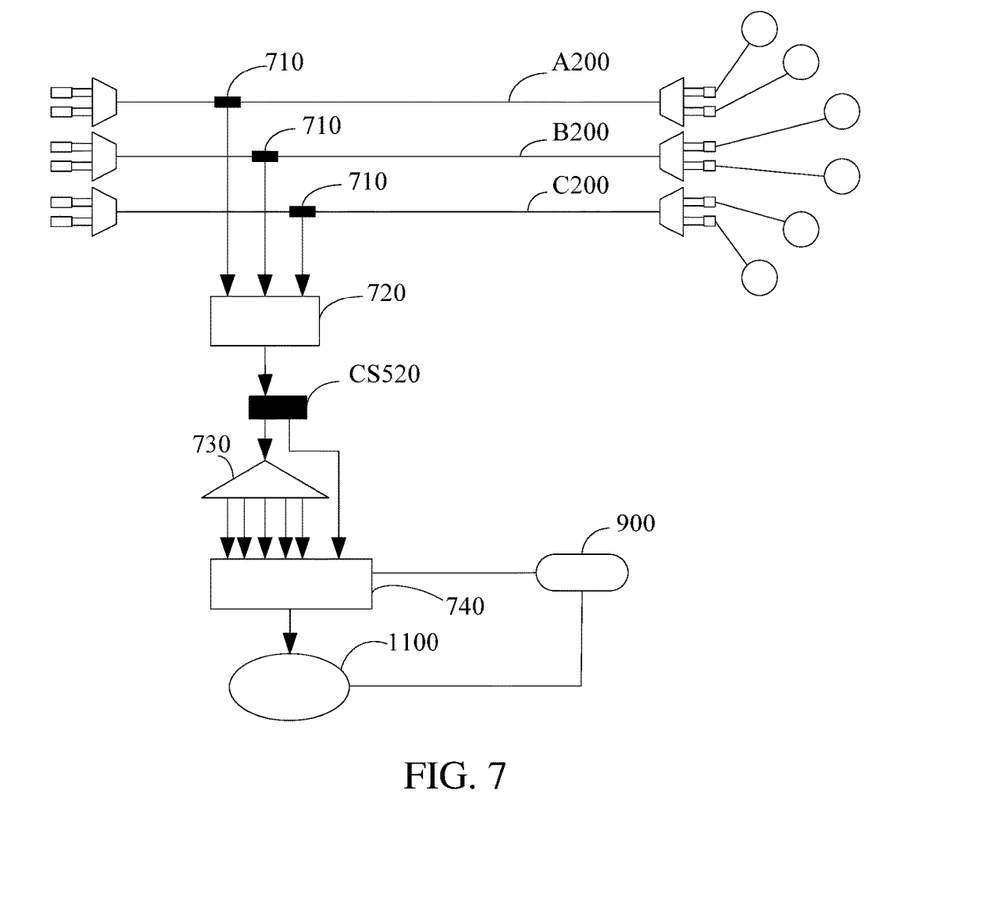
FIG. 7 is a schematic structural diagram of a seventh embodiment of the present invention.

Referring to FIG. 7, this embodiment differs from the sixth embodiment in that, a second splitter CS520 is further included, the second splitter CS520 has two output ends, and one channel is added to a second-stage light switcher 740. In this embodiment, the second splitter CS20 is a power splitter.

Light is emitted from the first-stage light switcher 720, enters the second splitter CS520, and then is divided into two paths of light; one path of light is output to a wavelength division multiplexer 730, and the other path of light is output to the second-stage light switcher 740.

A light extractor, namely, the power splitter 710 extracts signal light of a particular trunk optical fiber and feeds the signal light into the first-stage light switcher 720. The terminal 900 controls the first-stage light switcher 720 to feed signal light of a particular trunk optical fiber to the second splitter CS520. The signal light is directly output from the second splitter CS520 to the second-stage light switcher 740 without passing the wavelength division multiplexer 730. The detection device 1100 can receive signal light that is not demultiplexed and that is of a particular trunk optical fiber. If signal light output from the second splitter CS520 passes the wavelength division multiplexer 730, the second-stage light switcher 740 can then be controlled to select signal light of a particular wavelength. The detection device 1100 receives signal light of a particular wavelength of a particular trunk optical fiber. Powers and wavelengths of all signal light can be quickly detected by checking spectrums of all the signal light, thereby quickly finding faults and improving communication quality.

Referring to FIG. 7, in this embodiment, a third transport unit includes a power splitter 710, a first-stage light switcher 720, a second splitter CS520, a wavelength division multiplexer 730, and a second-stage light switcher 740.

The foregoing describes the first embodiment, but this embodiment may further have some variants, for example:

The second splitter CS520 may have at least three channels. Accordingly, another channel is added to the second-stage light switcher 740.

Figure 8:
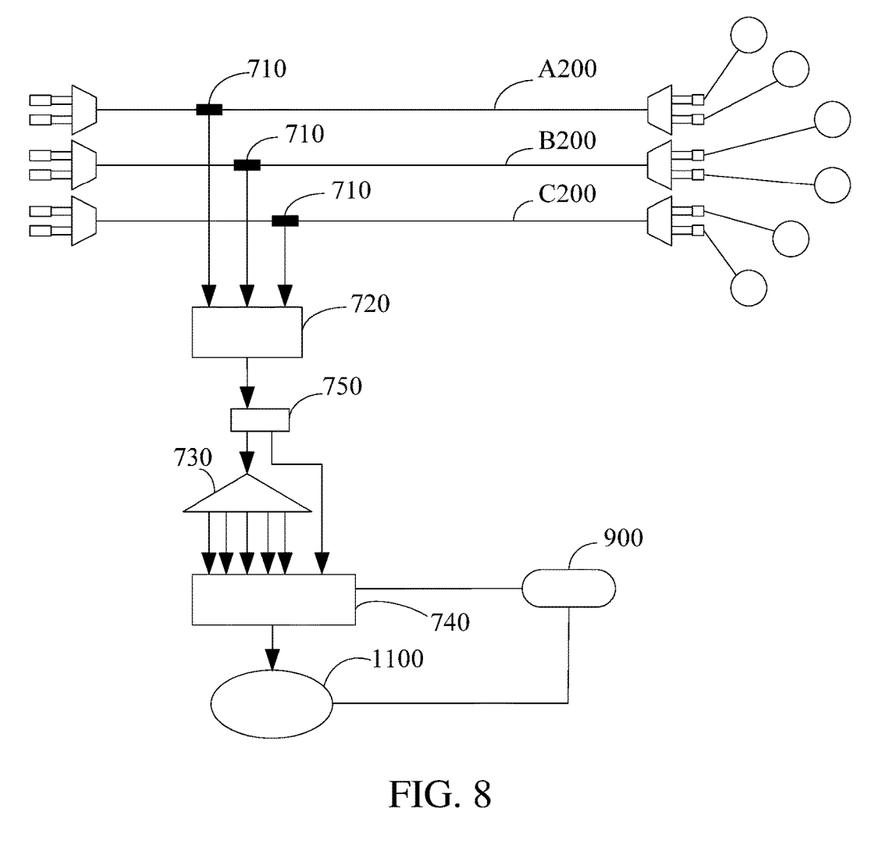
FIG. 8 is a schematic structural diagram of variation of the seventh embodiment of the present invention.

Referring to FIG. 8, the second splitter CS520 is replaced with a third-stage light switcher 750.

Eighth Embodiment

Referring to FIG. 6 to FIG. 9, this embodiment differs from the sixth and seventh embodiments in that, a wavelength division multiplexer 730 is replaced with a coarse wavelength division multiplexer 731 and a dense wavelength division multiplexer 732.

Figure 9:
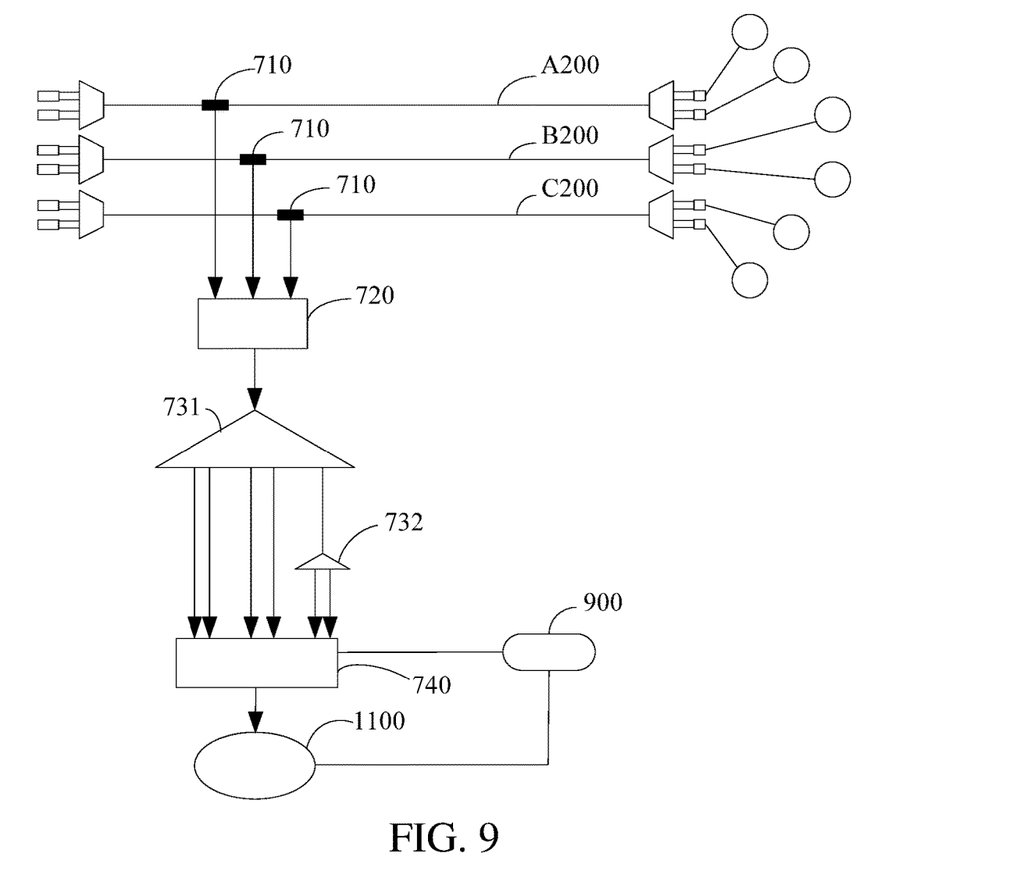
FIG. 9 is a schematic structural diagram of an eighth embodiment of the present invention.

This embodiment is applicable to a manner in which coarse wavelength division multiplexing and dense wavelength division multiplexing are used in trunk transmission. A light extractor, that is, a power splitter 710 extracts signal light of a particular trunk optical fiber into a first-stage light switcher 720. Signal light on which coarse wavelength division multiplexing is performed is fed into the coarse wavelength division multiplexer 731 by the first-stage light switcher 720 for demultiplexing, and then is fed into the second-stage light switcher 740. Signal light on which dense wavelength division multiplexing is performed first enters the coarse wavelength division multiplexer 731, then is output from a corresponding wavelength port of the coarse wavelength division multiplexer 731 to the dense wavelength division multiplexer 732, demultiplexed by the dense wavelength division multiplexer 732, and then is output from a corresponding wavelength port of the dense wavelength division multiplexer 732 to the second-stage light switcher 740.

According to the foregoing description, it can be learned that the coarse wavelength division multiplexer 731 matches the dense wavelength division multiplexer 732, and the network can be detected even in a manner of using coarse wavelength division multiplexing and dense wavelength division multiplexing in trunk transmission.

In this embodiment, a third transport unit includes a power splitter 710, a first-stage light switcher 720, a coarse wavelength division multiplexer 731, a dense wavelength division multiplexer 732, and a second-stage light switcher 740.

Ninth Embodiment

Figure 10:
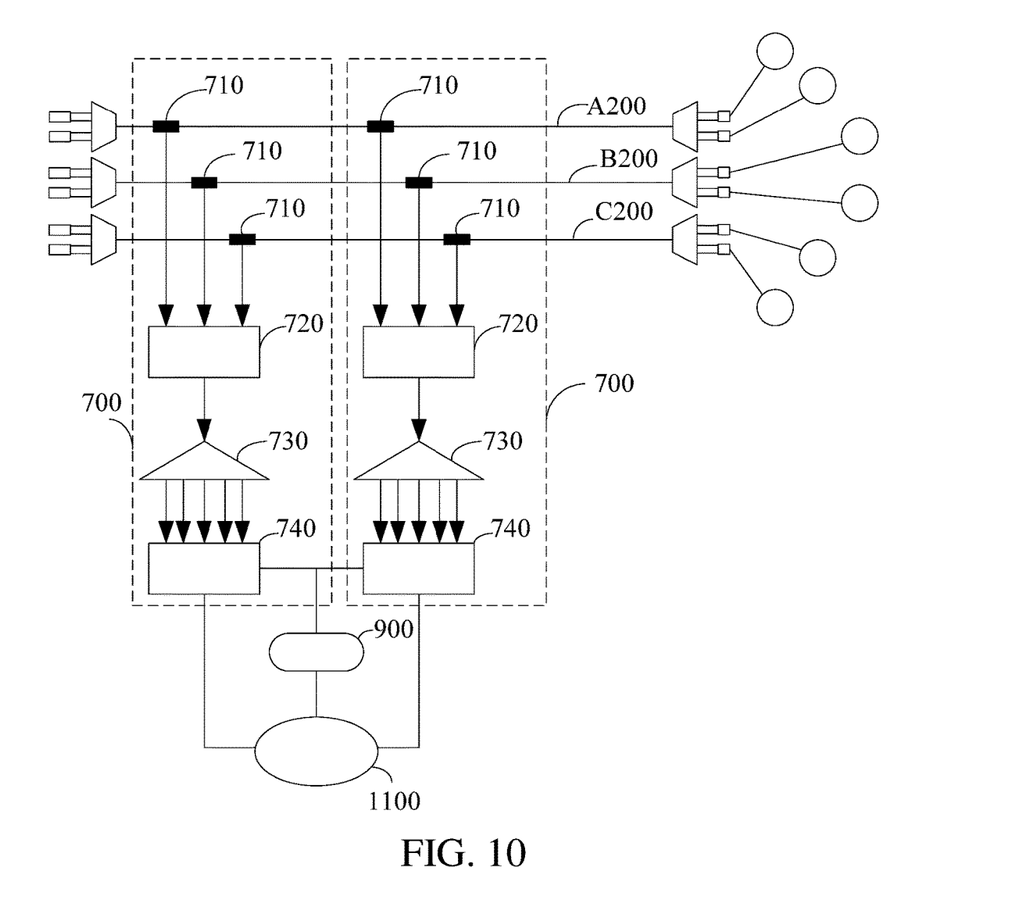
FIG. 10 is a schematic structural diagram of a ninth embodiment of the present invention.

Referring to FIG. 6 and FIG. 10, this embodiment differs from the sixth embodiment in that, a network system in this embodiment includes two two-stage switchers 700, and the two two-stage switchers 700 can share one detection device 1100.

One two-stage switcher collects uplink signal light of three trunk optical fibers, and the other two-stage switcher collects downlink signal light; alternatively, one two-stage switcher collects a half of signal light of three trunk optical fibers, and the other two-stage switcher collects the other half of signal light. In this way, at least two paths of signal light from the two-stage switcher, including uplink signal light, downlink signal light, and a half of signal light of a particular trunk can be simultaneously detected by using one detection device 1100.

According to the foregoing content, it can be learned that signal light of the trunk optical fiber is simultaneously detected by using two two-stage switchers, so that a half of detection time can be reduced, thereby finding faults in the network more quickly.

The foregoing describes the first embodiment, but this embodiment may further have some variants, for example:

The solution of this embodiment may also be applied to the seventh and eighth embodiments:

At least three two-stage switchers can further be used, to further reduce detection time.

The second-stage light switcher 740 may select an optical switch having two or more output channels, and a detection device is accordingly added. Each output channel of the second-stage light switcher 740 corresponds to one detection device, to further reduce detection time.

The foregoing content is further detailed descriptions made to the present invention with reference to specific/preferred embodiments, and specific embodiment of the present invention cannot be determined to be limited only to these descriptions. For a person of ordinary skill in the art to which the present invention belongs, on a premise of not departing from a conception of the present invention, he/she may further make several replacements or modifications on the described embodiments, and these replacement or modification manners should be considered to fall within the protection scope of the present invention.

What is claimed is:

1. A passive wavelength division mobile fronthaul network system, comprising a central office end, a remote end, and a trunk optical fiber, and further comprising a detector, a first wavelength division multiplexing apparatus, a second wavelength division multiplexing apparatus, an optical transport unit, and a reflector, wherein an optical path can be formed between the detector and the first wavelength division multiplexing apparatus, one end of the trunk optical fiber is connected to the first wavelength division multiplexing apparatus, the other end of the trunk optical fiber is connected to the second wavelength division multiplexing apparatus; the optical transport unit can transmit detection light from an output end of the second wavelength division multiplexing apparatus to each branch of the remote end, and the reflector is deployed on an end of each branch of the remote end;

further comprising a two-stage switcher and a detection device, wherein the two-stage switcher comprises a light extractor, a first-stage light switcher, a wavelength division multiplexer, and a second-stage light switcher, the light extractor is mounted on the trunk optical fiber, the first-stage light switcher receives light output by the light extractor, the wavelength division multiplexer transmits light between the first-stage light switcher and the second-stage light switcher, and the detection device receives light output by the second-stage light switcher; and further comprising a second splitter or a third-stage light switcher, wherein the wavelength division multiplexer receives, by using the second splitter or the third-stage light switcher, light output by the first-stage light switcher, and the second-stage light switcher receives light output by the second splitter or the third-stage light switcher.

2. The passive wavelength division mobile fronthaul network system according to claim 1, wherein the wavelength division multiplexer is replaced with a coarse wavelength division multiplexer and a dense wavelength division multiplexer that receives light output by the coarse wavelength division multiplexer, the first-stage light switcher outputs light to the coarse wavelength division multiplexer, and the second-stage light switcher receives light emitted from the dense wavelength division multiplexer.

3. The passive wavelength division mobile fronthaul network system according to claim 1, wherein there are two or more two-stage switchers, one of the two-stage switchers collects uplink signals on the trunk optical fiber, and one of the two-stage switchers collects downlink signals on the trunk optical fiber; or one of the two-stage switchers collects a half of signals of the trunk optical fiber, and one of the two-stage switcher collects the other half of signals of the trunk optical fiber.

4. The passive wavelength division mobile fronthaul network system according to claim 1, further comprising at least one terminal, wherein the terminal is connected to the two-stage switcher and/or the detection device, and the terminal can send an alarm signal.

5. The passive wavelength division mobile fronthaul network system according to claim 1, wherein the first wavelength division multiplexing apparatus consists of a central office end wavelength division multiplexer provided with a detection light channel, or consists of a central office end wavelength division multiplexer provided with no detection light channel and a first add/drop multiplexer; the second wavelength division multiplexing apparatus consists of a remote end wavelength division multiplexer provided with a detection light channel, or consists of a remote end wavelength division multiplexer provided with no detection light channel and a second add/drop multiplexer; the optical transport unit comprises a first splitter and a third add/drop multiplexer; the first splitter can extract light between the second wavelength division multiplexing apparatus and the third add/drop multiplexer; and the third add/drop multiplexer is deployed on a branch of the remote end.

6. The passive wavelength division mobile fronthaul network system according to claim 5, further comprising a third splitter, wherein detection light emitted by the detector is transmitted to the detection light channel and/or the first add/drop multiplexer of the central office end wavelength division multiplexer after being transmitted to the third splitter, there is at least one detector, and there is at least one third splitter.

* * * * *